United States Patent
Cooper et al.

(12) 
(10) Patent No.: US 6,228,201 B1
(45) Date of Patent: May 8, 2001

(54) PINHOLE-RESISTANT EXTRUSION METHOD

(75) Inventors: James L. Cooper; Michael W. Potts, both of Lake Jackson, TX (US)

(73) Assignee: The Dow Chemical Company, Midland, MI (US)

(*) Notice: Subject to any disclaimer, the term of this patent is extended or adjusted under 35 U.S.C. 154(b) by 0 days.

(21) Appl. No.: 09/058,443

(22) Filed: Apr. 9, 1998

Related U.S. Application Data (60) Provisional application No. 60/043,780, filed on Apr. 11, 1997.

(51) Int. Cl.[7] .................................................. B29C 47/06
(52) U.S. Cl. .................................. 156/244.11; 156/308.2; 427/358
(58) Field of Search ........................................ 428/509, 511, 428/512, 513, 514; 525/240; 526/329, 352, 352.2, 348; 264/173.19; 156/242, 244.11, 308.2; 427/411, 358

(56) References Cited

U.S. PATENT DOCUMENTS 4,339,507  7/1982  Kurtz et al. ........................... 428/522
5,582,923 * 12/1996  Kale et al. ............................ 428/523

FOREIGN PATENT DOCUMENTS 0 769 523 A2  4/1997  (EP).
WO 97/12755  4/1997  (WO).

* cited by examiner

*Primary Examiner*—Paul Thibodeau
*Assistant Examiner*—D. Lawrence Tarazano (57) ABSTRACT

This invention relates to a pinhole-free, pinhole-resistant extrusion composition comprising at least one olefin polymer and to a method of making a pinhole-free, pinhole-resistant coated or laminated substrate. The invention uses either a single polymer composition or a polymer blend wherein the composition has a corrected or actual Goettfert melt strength value in the range of from about 0.01 to about 6.5 centiNetwons to provide a pinhole-free, pinhole-resistant extrusion coating, extrusion lamination, adhesive lamination or in-mold coating or the like. Suitable olefin polymers include high pressure, free-radical initiated ethylene polymers and homogeneously branched ethylene polymers with polymer blends of low density polyethylene and substantially linear ethylene polymers particularly preferred. The coatings, moldings, films or laminations are useful for various substrates including paperboard and can protect against product leakage in such applications as disposable cups for hot beverages.

24 Claims, 5 Drawing Sheets

PINHOLE-RESISTANT EXTRUSION METHOD

CROSS REFERENCE TO RELATED APPLICATIONS

This application is a continuation-in-part application of U.S. Provisional Application No. 60/043,780, filed Apr. 11, 1997, in the names of James L. Cooper and Michael W. Potts.

FIELD OF THE INVENTION

This invention relates to a pinhole-resistant extrusion composition comprising at least one olefin polymer, a method of making a pinhole-resistant coating or laminate and a pinhole-resistant article. In particular, this invention relates to a pinhole-free, pinhole-resistant olefin polymer composition comprising at least one olefin polymer wherein the composition is characterized by a corrected or actual Goettfert melt strength value at 190° C. in the range of from about 0.01 centiNewtons to about 6.5 centiNewtons. Also, this invention particularly relates to a method of using the so-characterized extrusion composition to make a pinhole-resistant coating or laminate, especially a pinhole-free, pinhole-resistant paperboard coating or laminate for use in fabricating a container useful for flowable materials.

BACKGROUND OF THE INVENTION

There are many known olefin polymers that are generally suitable for making extrusion coated or laminated substrates such as paperboard. Although Ziegler catalyzed polymers such as heterogeneously branched linear low density ethylene polymers and substantially linear ethylene polymers have been described as suitable for extrusion coating, laminating and extrusion cast film purposes, high pressure free-radical initiated ethylene polymers such as low density polyethylene (LDPE), ethylene-acrylic acid (EAA) copolymers and ethylene-vinyl acetate (EVA) copolymers continue to be the dominant resins of choice for various extrusion coating and laminating applications. While any of the aforementioned ethylene polymers can be conveniently extrusion coated or laminated onto a substrate to prepare an initially pinhole-free coating or laminate, for many applications, when the coated or laminated substrate is subsequently subjected to a substantial thermal treatment or heat history which remelts the polymeric coating, film or laminating material, pinholes often form in the coating, film or laminating material and remain after the substrate is permitted to cool and the polymeric coating, film or laminating material recrystallizes or resolidifies.

Pinholes that form after an initial polymeric coating, film or laminating material is remelted typically form due to volatilization of volatile substances. Volatile substances can profusely contribute to pinholing when they are initially entrained in the substrate or trapped at the interface between the polymeric coating, film or laminating material and the substrate. Volatile substances may be present in the coated or laminated substrate due to contamination occurring during the initial coating or lamination process step or more typically results from excessive moisture contents in the coating material or the substrate. However, to insure proper machining such as folding, cutting and stamping, paperboard substrates are typically specified to contain a minimum of about 6 weight percent moisture. As such, elimination of pinholing by rendering the paperboard substantially dry or by substantially controlling the moisture content of the paperboard is not considered to be a viable option for providing a pinhole-free, pinhole-resistant coated or laminated paperboard.

One example where pinholing can cause performance failures (e.g., leakers) pertains to disposable hot beverage containers made from extrusion coated or laminated paperboard. Known low density polyethylene paperboard coatings and laminates typically provide about 1.5 pinholes per $cm^2$ of sealing area per 237 $cm^3$ cup size (e.g. disposable coffee cup service). The pinholes develop and remain after a heat or flame sealing process step in the cup-making operation which is performed to make the back seal and to attach the cup bottom portion to the side walls or cup body.

Occasionally, a coated or laminated paperboard container may still be suitable for a particular service although it although contains numerous pinholes. However, containers intended for hot beverage service (e.g., hot coffee and hot tea) must be substantially pinhole-free, otherwise leakage will occur and/or the paperboard itself will become saturated and structurally weakened.

Notwithstanding the various known olefin polymer extrusion compositions, there remains a need for an olefin polymer extrusion composition which provides less than 1.5 pinholes per $cm^2$ of sealing area when tested on a 237 $cm^3$ coated or laminated paperboard cup having a back and bottom portion seals wherein the seals are made using sealing temperatures above the softening point of the composition. There is also a need for a method of making pinhole-free, pinhole resistant extrusion coatings, extrusion cast films, and blown films. There is also a need for a pinhole-free, pinhole-resistant coated or laminated article such as paperboard (or any other substrate generally characterized as having more than 1 weight percent volatile substance content). There is also a need for a method of making a pinhole-free, pinhole-resistant container for flowable materials. There is also a need for a method of making a pinhole-free, pinhole-resistant disposable container. There is a need for a method of making a pinhole-free, pinhole-resistant coated or laminated article such as a paperboard beverage cup.

SUMMARY OF THE INVENTION

We have discovered a novel extrusion composition and method for minimizing the number of pinholes that typically occur for coated or laminated substrates where the substrate itself is characterized as having a high volatile substance content (such as, for example, but not limited to, greater than or equal to about 1 percent by weight moisture in paperboard). One aspect of the present invention is a pinhole-resistant extrusion composition comprising at least one olefin polymer, wherein the composition is characterized as having a corrected or actual Goettfert melt strength value at 190° C., as measured using a Rheotens unit, in the range of about 0.01 centiNewtons to about 6.5 centiNewtons (cN).

Another aspect of the present invention is a method for making a pinhole resistant coated or laminated substrate comprising:

(a) providing an extrusion composition comprising at least one olefin polymer wherein the composition is characterized as having a corrected or actual Goettfert melt strength value at 190° C., as measured using a Rheotens unit, in the range of about 0.01 centiNewtons to about 6.5 centiNewtons, (b) applying the composition to a substrate, (c) collecting the substrate with the extruded coating or laminated film for subsequent use or transferring the substrate with the extruded coating or laminated film for further processing.

DETAILED DESCRIPTION OF THE INVENTION

Practitioners will appreciate that the inventive extrusion composition can be a single polymer composition or prepared as a polymer blend from at least two polymers where at least one of the two polymers is an olefin polymer. Although various polymer combinations can be used to provide the inventive extrusion composition, the inventive composition, either as a single polymer composition or as a polymer blend, is characterized by corrected or actual Goettfert melt strength value at 190° C. of less than or equal to about 6.5 cN and greater than or equal to about 0.01 cN. Preferably, the corrected or actual Goettfert melt strength value at 190° C. is in the range of from about 0.01 to about 5 cN, more preferably the corrected or actual Goettfert melt strength value at 190° C. is in the range of from about 0.05 to about 2.7 cN, most preferably the corrected or actual Goettfert melt strength value at 190° C. is in the range of from about 0.1 to about 2 cN.

For the method of making a pinhole-free, pinhole resistant coated or laminated substrate, the preferred application technique is either (i) extruding the composition onto the substrate as an extrusion coating, or (ii) fabricating the composition into a film and then laminating the film to the substrate. However, the most preferred application technique is extruding the composition onto the substrate as an extrusion coating. A preferred extrusion coating technique is direct extrusion. The most preferred extrusion coating technique is direct extrusion of the composition onto the product or food contact surface of the substrate (e.g. as the inside coating of a drinking cup).

The present discovery is considered to be very surprisingly in that ordinarily higher melt strengths would be expected to be required to resist pinholing (rather than melt strengths less than or equal to about 6.5 cN and a preference for even lower melt strength as specified by the present invention). That is, while many dimples or pseudo-pinholes may form after exposure to a post-coating or post-lamination thermal treatment or heat history such as, for example, a heat sealing operation, only those pinholes in the coating that are open to the substrate and leave the substrate exposed and unprotected cause contained product leakage. Yet, ordinarily, the ability to resist the kind of ruptures of the softened, molten or semi-molten coating or film that yield pinholes would be expected to relate to higher polymer burst strengths. Further, higher burst strengths would be expected to correlate to higher melt strengths. In clear contradistinction to this expectation, in the present invention, lower melt strengths (i.e., less than or equal to about 6.5 cN) provide improved pinhole resistance.

The present invention not only provides less or reduced pinholing (i.e. burst-through which exposes the substrate), the invention also provides less or reduced dimpling which in itself provides an aesthetic advantage. Another advantage of the present invention is pinhole resistant after a post-coating thermal treatment or heat history can be accomplished at relatively thin coating or film thickness. While thicker coatings or films are known or expected to provide improved resistance to pinholing, in the present invention, surprisingly pinhole resistance is accomplished at coating or film thicknesses less than or equal to 2 mils (0.051 mm), even at less than or equal to 1.5 mil (0.038 mm) and even more surprisingly at less than or equal to 1 mil (0.025 mm).

The term "flowable material" as used herein means material which is flowable under gravity or which may be pumped, but the term "flowable materials" does not include gaseous materials. Flowable materials include, for example, but are not limited to, noncarbonated liquids (e.g., milk, water, tea, coffee, coca, sports drinks, fruit juice, fruit drinks, wine) and carbonated liquids (e.g., soda, beer, champagne, water); oleaginous liquids (e.g., cooking oil or motor oil); emulsions (e.g., ice cream, cheese, yogurt, soft margarine); pastes (for example, meat pastes, peanut butter); preserves (e.g., jams, pie fillings, marmalade); jellies; dough; ground meat (e.g., sausage meat); powders (e.g., gelatin powders, detergents); granular solids (e.g., nuts, sugar, cereal); and like materials.

The term "single polymer composition" as used herein means the composition is manufactured in a single polymerization reaction system whether or not the system comprises multiple inlets for monomer or catalyst injection and irrespective of the type of catalyst or catalyst systems employed to manufacture the composition. For example, DOWLEX™ linear low density polyethylene 2045 and AFFINITY™ polyolefin plastomer PL 1850, both supplied commercially by The Dow Chemical Company, are single polymer compositions as the term "single polymer composition" is used herein.

The term "polymer blend" as used herein means the composition is prepared from more than one polymer product. For example, a composition manufactured from a dual catalyst system (e.g., hafnium with zirconium as described in U.S. Pat. No. 5,218,071) and/or manufactured in a multiple reactor system (e.g., as described in PCT Patent Application 94/01052 or in pending U.S. application Ser. No. 08/327,156, filed Oct. 21, 1994, the disclosures of which are incorporated herein by reference), whether or not the reactors are in a series or parallel configuration, is a polymer blend as the term "polymer blend" is used herein.

The term "direct extrusion" as used herein means directly extruding the inventive composition onto at least one surface of a substrate. That is, in the instance of direct extrusion, the layer or multilayer at or immediately adjacent to one or both surfaces of the substrate is the result of an extrusion coating or co-extrusion coating operation and the layer or at least one layer of the multilayer comprises at least one inventive composition and wherein treatments of the substrate such as corona treatment, clay coating, flame treatment, or the like are not considered to constitute a layer. In direct extrusion, the substrate itself is typically, a non-plastic material such as a paper product, although the term "direct extrusion" is not limited to applying the inventive composition onto non-plastic substrates.

The term "corrected Goettfert melt strength" as used herein means the actual Goettfert melt strength value has been corrected to a 5.0 $I_2$ melt index. A corrected Goettfert melt strength value is the product of the formula:

$$\text{corrected melt strength} = \frac{\text{actual melt strength, cN} \times 5.0 \text{ g}/10 \text{ min.}}{\text{actual } I_2 \text{ melt index, g}/10 \text{ min.}}$$

wherein the actual Goettfert melt strength and actual $I_2$ melt index of an inventive composition (or comparative composition) are determined as described herein, i.e., at 190° C. using a Rheotens unit and in accordance with ASTM D-1238 Condition 190/2.16 kg, respectively.

The term "volatile substance" as used herein refers to any substance that is volatile (i.e., tends to vaporize rapidly) at conditions (e.g. temperature and pressure) that softens or melts the inventive extrusion composition. For example, moisture is a volatile substance at 1 atmosphere and the softening temperature of high pressure, free-radical initiated low density polyethylene (LDPE).

The term "homogeneously branched ethylene polymer" is used herein in the conventional sense to refer to an ethylene interpolymer in which the comonomer is randomly distributed within a given polymer molecule and wherein substantially all of the polymer molecules have the same ethylene to comonomer molar ratio. The term refers to an ethylene interpolymer that is characterized by a relatively high short chain branching distribution index (SCBDI) or composition distribution branching index (CDBI), i.e., a uniform short chain branching distribution.

Homogeneously branched ethylene polymers have a SCBDI greater than or equal to 50 percent, preferably greater than or equal to 70 percent, more preferably greater than or equal to 90 percent. Preferably, the homogeneously branched ethylene polymer is further characterized as having a narrow, essentially single melting TREF profile/curve and essentially lacking a measurable high density polymer portion (i.e. the polymer does not contain polymer fraction with a degree of short branching equal to or more than about 30 methyls/1000 carbons or, alternatively, at densities less than 0.936 g/cc, the polymer does not contain polymer fraction eluting at temperatures greater than 95° C.).

SCBDI is defined as the weight percent of the polymer molecules having a comonomer content within 50 percent of the median total molar comonomer content and represents a comparison of the monomer distribution in the interpolymer to the monomer distribution expected for a Bernoullian distribution. The SCBDI of an interpolymer can be readily calculated from TREF as described, for example, by Wild et al., *Journal of Polymer Science, Poly. Phys. Ed.*, Vol. 20, p. 441 (1982), or in U.S. Pat. Nos. 4,798,081; 5,008,204; or by L. D. Cady, "The Role of Comonomer Type and Distribution in LLDPE Product Performance," SPE Regional Technical Conference, Quaker Square Hilton, Akron, Ohio, October 1–2, pp. 107–119 (1985), the disclosures of all which are incorporated herein by reference. However, the preferred TREF technique does not include purge quantities in SCBDI calculations. More preferably, the monomer distribution of the interpolymer and SCBDI are determined using $^{13}$C NMR analysis in accordance with techniques described in U.S. Pat. No. 5,292,845; U.S. Pat. No. 4,798,081; U.S. Pat. No. 5,089,321 and by J. C. Randall, *Rev. Macromol. Chem. Phys.*, C29, pp. 201–317, the disclosures of all of which are incorporated herein by reference.

In analytical temperature rising elution fractionation analysis (as described in U.S. Pat. No. 4,798,081 and abbreviated herein as "ATREF"), the film or composition to be analyzed is dissolved in a suitable hot solvent (e.g., trichlorobenzene) and allowed to crystallized in a column containing an inert support (stainless steel shot) by slowly reducing the temperature. The column is equipped with both a refractive index detector and a differential viscometer (DV) detector. An ATREF-DV chromatogram curve is then generated by eluting the crystallized polymer sample from the column by slowly increasing the temperature of the eluting solvent (trichlorobenzene). The ATREF curve is also frequently called the short chain branching distribution (SCBD), since it indicates how evenly the comonomer (e.g., octene) is distributed throughout the sample in that as elution temperature decreases, comonomer content increases. The refractive index detector provides the short chain distribution information and the differential viscometer detector provides an estimate of the viscosity average molecular weight. The short chain branching distribution and other compositional information can also be determined using crystallization analysis fractionation such as the CRYSTAF fractionalysis package available commercially from PolymerChar, Valencia, Spain.

Preferred homogeneously branched ethylene polymers (such as, but not limited to, substantially linear ethylene polymers) have a single melting peak between −30 and 150° C., as determined using differential scanning calorimetry (DSC), as opposed to traditional Ziegler polymerized heterogeneously branched ethylene polymers (i.e., LLDPE and ULDPE or VLDPE) which have two or more melting points.

However, those polymers having a density of about 0.875 g/cm$^3$ to about 0.91 g/cm$^3$, the single melt peak may show, depending on equipment sensitivity, a "shoulder" or a "hump" on the side low of the melting peak (i.e. below the melting point) that constitutes less than 12 percent, typically, less than 9 percent, more typically less than 6 percent of the total heat of fusion of the polymer. This artifact is due to intra-polymer chain variations, and it is discerned on the basis of the slope of the single melting peak varying monotonically through the melting region of the artifact. The artifact occurs within 34° C., typically within 27° C., and more typically within 20° C. of the melting point of the single melting peak.

The single melting peak is determined using a differential scanning calorimeter standardized with indium and deionized water. The method involves about 5–7 mg sample sizes, a "first heat" to about 150° C. which is held for 4 minutes, a cool down at 10° C./min. to −30° C. which is held for 3 minutes, and heat up at 10° C./min. to 150° C. to provide a "second heat" heat flow vs. temperature curve. Total heat of fusion of the polymer is calculated from the area under the curve. The heat of fusion attributable to this artifact, if present, can be determined using an analytical balance and weight-percent calculations.

The term "linear" as used herein means that the ethylene polymer does not have long chain branching. That is, the polymer chains comprising the bulk linear ethylene polymer have an absence of long chain branching, as in the case of traditional linear low density polyethylene polymers or linear high density polyethylene polymers made using Ziegler polymerization processes (e.g., U.S. Pat. No. 4,076,698 (Anderson et al.)), sometimes called heterogeneous polymers. The term "linear" does not refer to bulk high pressure branched polyethylene, ethylene/vinyl acetate copolymers, or ethylene/vinyl alcohol copolymers which are known to those skilled in the art to have numerous long chain branches.

The term "homogeneously branched linear ethylene polymer" refers to polymers having a narrow short chain branching distribution and an absence of long chain branching. Such "linear" uniformly branched or homogeneous polymers include those made as described in U.S. Pat. No. 3,645,992 (Elston) and those made using so-called single site catalysts in a batch reactor having relatively high ethylene concentrations (as described in U.S. Pat. No. 5,026, 798 (Canich) or in U.S. Pat. No. 5,055,438 (Canich)) or those made using constrained geometry catalysts in a batch reactor also having relatively high olefin concentrations (as described in U.S. Pat. No. 5,064,802 (Stevens et al.) or in EP 0 416 815 A2 (Stevens et al.)).

Typically, homogeneously branched linear ethylene polymers are ethylene/α-olefin interpolymers, wherein the α-olefin is at least one $C_3$–$C_{20}$ α-olefin (e.g., propylene, 1-butene, 1-pentene, 4methyl-1-pentene, 1-hexene, 1-octene and the like) and preferably the at least one $C_3$–$C_{20}$ α-olefin is 1-butene, 1-hexene or 1-octene. Most preferably, the ethylene/α-olefin interpolymer is a copolymer of ethylene and a $C_3$–$C_{20}$ α-olefin, and especially an ethylene/$C_4$–$C_8$ α-olefin copolymer such as an ethylene/1-octene copolymer, ethylene/1-butene copolymer, ethylene/1-pentene copolymer or ethylene/1-hexene copolymer.

Suitable homogeneously branched linear ethylene polymers for use in the invention are sold under the designation of TAFMER by Mitsui Chemical Corporation and under the designations of EXACT and EXCEED resins by Exxon Chemical Corporation.

The term "substantially linear ethylene polymer" as used herein means that the bulk ethylene polymer is substituted, on average, with about 0.01 long chain branches/1000 total carbons to about 3 long chain branches/1000 total carbons (wherein "total carbons" includes both backbone and branch carbons). Preferred polymers are substituted with about 0.01 long chain branches/1000 total carbons to about 1 long chain branches/1000 total carbons, more preferably from about 0.05 long chain branches/1000 total carbons to about 1 long chain branched/1000 total carbons, and especially from about 0.3 long chain branches/1000 total carbons to about 1 long chain branches/1000 total carbons.

As used herein, the term "backbone" refers to a discrete molecule, and the term "polymer" or "bulk polymer" refers, in the conventional sense, to the polymer as formed in a reactor. For the polymer to be a "substantially linear ethylene polymer", the polymer must have at least enough molecules with long chain branching such that the average long chain branching in the bulk polymer is at least an average of from about 0.01/1000 total carbons to about 3 long chain branches/1000 total carbons.

The term "bulk polymer" as used herein means the polymer which results from the polymerization process as a mixture of polymer molecules and, for substantially linear ethylene polymers, includes molecules having an absence of long chain branching as well as molecules having long chain branching. Thus a "bulk polymer" includes all molecules formed during polymerization. It is understood that, for the substantially linear polymers, not all molecules have long chain branching, but a sufficient amount do such that the average long chain branching content of the bulk polymer positively affects the melt rheology (i.e., the melt fracture properties) as described herein below and elsewhere in the literature.

Long chain branching (LCB) is defined herein as a chain length of at least one (1) carbon less than the number of carbons in the comonomer, whereas short chain branching (SCB) is defined herein as a chain length of the same number of carbons in the residue of the comonomer after it is incorporated into the polymer molecule backbone. For example, a substantially linear ethylene/1-octene polymer has backbones with long chain branches of at least seven (7) carbons in length, but it also has short chain branches of only six (6) carbons in length.

Long chain branching can be distinguished from short chain branching by using $^{13}C$ nuclear magnetic resonance (NMR) spectroscopy and to a limited extent, e.g., for ethylene homopolymers, it can be quantified using the method of Randall, (Rev. Macromol. Chem. Phys., C29 (2&3), p. 285–297), the disclosure of which is incorporated herein by reference. However as a practical matter, current $^{13}C$ nuclear magnetic resonance spectroscopy cannot determine the length of a long chain branch in excess of about six (6) carbon atoms and as such, this analytical technique cannot distinguish between a seven (7) carbon branch and a seventy (70) carbon branch. The long chain branch can be as long as about the same length as the length of the polymer backbone.

Although conventional $^{13}C$ nuclear magnetic resonance spectroscopy cannot determine the length of a long chain branch in excess of six carbon atoms, there are other known techniques useful for quantifying or determining the presence of long chain branches in ethylene polymers, including ethylene/1-octene interpolymers. For example, U.S. Pat. No. 4,500,648, incorporated herein by reference, teaches that long chain branching frequency (LCB) can be represented by the equation $LCB = b/M_w$ wherein b is the weight average number of long chain branches per molecule and $M_w$ is the weight average molecular weight. The molecular weight averages and the long chain branching characteristics are determined by gel permeation chromatography and intrinsic viscosity methods, respectively.

Two other useful methods for quantifying or determining the presence of long chain branches in ethylene polymers, including ethylene/1-octene interpolymers are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., J. Chem. Phys., 17, 1301 (1949) and Rudin, A., Modern Methods of Polymer Characterization, John Wiley & Sons, New York (1991) pp. 103–112, the disclosures of both of which are incorporated by reference.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is indeed a useful technique for quantifying the presence of long chain branches in substantially linear ethylene polymers. In particular, deGroot and Chum found that the level of long chain branches in substantially linear ethylene homopolymer samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

DeGroot and Chum also showed that a plot of $Log(I_2,$ melt index) as a function of Log(GPC Weight Average Molecular Weight) as determined by GPC-DV illustrates that the long chain branching aspects (but not the extent of long branching) of substantially linear ethylene polymers are comparable to that of high pressure, highly branched low density polyethylene (LDPE) and are clearly distinct from ethylene polymers produced using Ziegler-type catalysts such as titanium complexes and ordinary homogeneous catalysts such as hafnium and vanadium complexes.

For substantially linear ethylene polymers, the empirical effect of the presence of long chain branching is manifested as enhanced rheological properties which are quantified and expressed in terms of gas extrusion rheometry (GER) results and/or melt flow, $I_{10}/I_2$, increases.

The substantially linear ethylene polymers used in the present invention are a unique class of compounds that are further defined in U.S. Pat. No. 5,272,236, application Ser. No. 07/776,130, filed Oct. 15, 1991; U.S. Pat. No. 5,278,272, application Ser. No. 07/939,281, filed Sep. 2, 1992; and U.S. Pat. No. 5,665,800, application Ser. No. 08/730,766, filed Oct. 16, 1996, each of which is incorporated herein by reference.

Substantially linear ethylene polymers differ significantly from the class of polymers conventionally known as homogeneously branched linear ethylene polymers described above and, for example, by Elston in U.S. Pat. No. 3,645,992. As an important distinction, substantially linear ethylene polymers do not have a linear polymer backbone in the conventional sense of the term "linear" as is the case for homogeneously branched linear ethylene polymers.

Substantially linear ethylene polymers also differ significantly from the class of polymers known conventionally as heterogeneously branched traditional Ziegler polymerized linear ethylene interpolymers (for example, ultra low density polyethylene, linear low density polyethylene or high density polyethylene made, for example, using the technique disclosed by Anderson et al. in U.S. Pat. No. 4,076,698, in that substantially linear ethylene interpolymers are homogeneously branched polymers; that is, substantially linear ethylene polymers have a SCBDI greater than or equal to 50 percent, preferably greater than or equal to 70 percent, more preferably greater than or equal to 90 percent.

Substantially linear ethylene polymers also differ from the class of heterogeneously branched ethylene polymers in that substantially linear ethylene polymers are characterized as essentially lacking a measurable high density or crystalline polymer fraction as determined using a temperature rising elution fractionation technique.

The substantially linear ethylene polymer for use in the present invention is characterized as having (a) melt flow ratio, $I_{10}/I_2 \geq 5.63$, (b) a molecular weight distribution, $M_w/M_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$ and $M_w/M_n$ within ten percent of the substantially linear ethylene polymer and wherein the respective critical shear rates of the substantially linear ethylene polymer and the linear ethylene polymer are measured at the same melt temperature using a gas extrusion rheometer, (d) a single differential scanning calorimetry, DSC, melting peak between $-30°$ and $150°$ C., and (e) a short chain branching distribution index greater than 50 percent.

Determination of the critical shear rate and critical shear stress in regards to melt fracture as well as other rheology properties such as "rheological processing index" (PI), is performed using a gas extrusion rheometer (GER). The gas extrusion rheometer is described by M. Shida, R. N. Shroff and L. V. Cancio in *Polymer Engineering Science*, Vol. 17, No. 11, p. 770 (1977) and in *Rheometers for Molten Plastics* by John Dealy, published by Van Nostrand Reinhold Co. (1982) on pp. 97–99, the disclosures of which are incorporated herein by reference.

The processing index (PI) is measured at a temperature of $190°$ C., at nitrogen pressure of 2500 psig using a 0.0296 inch (752 micrometers) diameter (preferably a 0.0143 inch diameter die for high flow polymers, e.g. 50–100 $I_2$ melt index or greater), 20:1 L/D die having an entrance angle of $180°$. The GER processing index is calculated in millipoise units from the following equation:

$$PI = 2.15 \times 10^6 \text{ dyne/cm}^2 / (1000 \times \text{shear rate}),$$

where: $2.15 \times 10^6$ dyne/cm² is the shear stress at 2500 psi, and the shear rate is the shear rate at the wall as represented by the following equation:

$$32 \, Q'/(60 \text{ sec/min})(0.745)(\text{Diameter} \times 2.54 \text{ cm/in})^3,$$

where:

Q' is the extrusion rate (gms/min), 0.745 is the melt density of polyethylene (gm/cm³), and Diameter is the orifice diameter of the capillary (inches).

The PI is the apparent viscosity of a material measured at apparent shear stress of $2.15 \times 10^6$ dyne/cm².

For substantially linear ethylene polymers, the PI is less than or equal to 70 percent of that of a conventional linear ethylene polymer having an $I_2$, $M_w/M_n$ and density each within ten percent of the substantially linear ethylene polymer.

An apparent shear stress vs. apparent shear rate plot is used to identify the melt fracture phenomena over a range of nitrogen pressures from 5250 to 500 psig using the die or GER test apparatus previously described. According to Ramamurthy in *Journal of Rheology*, 30(2), 337–357, 1986, the disclosure of which is incorporated herein by reference, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". The onset of surface melt fracture is characterized at the beginning of losing extrudate gloss at which the surface roughness of extrudate can only be detected by 40× magnification. The critical shear rate at onset of surface melt fracture for the substantially linear ethylene polymers is at least 50 percent greater than the critical shear rate at the onset of surface melt fracture of a linear ethylene polymer having about the same $I_2$ and $M_w/M_n$. Preferably, the critical shear stress at onset of surface melt fracture for the substantially linear ethylene polymers of the invention is greater than about $2.8 \times 10^6$ dyne/cm².

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and critical shear stress at onset of gross melt fracture (OGMF) will be used herein based on the changes of surface roughness and configurations of the extrudates extruded by a GER. For the substantially linear ethylene polymers used in the invention, the critical shear stress at onset of gross melt fracture is preferably greater than about $4 \times 10^6$ dyne/cm$^2$.

For the processing index determination and for the GER melt fracture determination, substantially linear ethylene polymers are tested without inorganic fillers and do not have more than 20 ppm aluminum catalyst residue. Preferably, however, for the processing index and melt fracture tests, substantially linear ethylene polymers do contain antioxidants such as phenols, hindered phenols, phosphites or phosphonites, preferably a combination of a phenol or hindered phenol and a phosphite or a phosphonite.

Substantially linear ethylene polymers are known to have excellent processability, despite having a relatively narrow molecular weight distribution (that is, the $M_w/M_n$ ratio is typically less than about 3.5). Surprisingly, unlike homogeneously and heterogeneously branched linear ethylene polymers, the melt flow ratio ($I_{10}/I_2$) of substantially linear ethylene polymers can be varied essentially independently of the molecular weight distribution, $M_w/M_n$. Accordingly, especially when good extrusion processability is desired, the preferred ethylene polymer for use in the present invention is a homogeneously branched substantially linear ethylene interpolymer.

Suitable constrained geometry catalysts for use manufacturing substantially linear ethylene polymers include constrained geometry catalysts as disclosed in U.S. application Ser. No. 07/545,403, filed Jul. 3, 1990; U.S. application Ser. No. 07/758,654, filed Sep. 12, 1991; U.S. Pat. No. 5,132,380 (application Ser. No. 07/758,654); U.S. Pat. No. 5,064,802 (application Ser. No. 07/547,728); U.S. Pat. No. 5,470,993 (application Ser. No. 08/241,523); U.S. Pat. No. 5,453,410 (application Ser. No. 08/108,693); U.S. Pat. No. 5,374,696 (application Ser. No. 08/008,003); U.S. Pat. No. 5,532,394 (application Ser. No. 08/295,768); U.S. Pat. No. 5,494,874 (application Ser. No. 08/294,469); and U.S. Pat. No. 5,189,192 (application Ser. No. 07/647,111), the teachings of all of which are incorporated herein by reference.

Suitable catalyst complexes may also be prepared according to the teachings of WO 93/08199, and the patents issuing therefrom, all of which are incorporated herein by reference. Further, the monocyclopentadienyl transition metal olefin polymerization catalysts taught in U.S. Pat. No. 5,026,798, which is incorporated herein by reference, are also believed to be suitable for use in preparing the polymers of the present invention, so long as the polymerization conditions substantially conform to those described in U.S. Pat. No. 5,272,236; U.S. Pat. No. 5,278,272 and U.S. Pat. No. 5,665,800, especially with strict attention to the requirement of continuous polymerization. Such polymerization methods are also described in PCT/US 92/08812 (filed Oct. 15, 1992).

The foregoing catalysts may be further described as comprising a metal coordination complex comprising a metal of groups 3–10 or the Lanthanide series of the Periodic Table of the Elements and a delocalize β-bonded moiety substituted with a constrain-inducing moiety, said complex having a constrained geometry about the metal atom such that the angle at the metal between the centroid of the delocalized, substituted pi-bonded moiety and the center of at least one remaining substituent is less than such angle in a similar complex containing a similar pi-bonded moiety lacking in such constrain-inducing substituent, and provided further that for such complexes comprising more than one delocalized, substituted pi-bonded moiety, only one thereof for each metal atom of the complex is a cyclic, delocalized, substituted pi-bonded moiety. The catalyst further comprises an activating cocatalyst.

Suitable cocatalysts for use herein include polymeric or oligomeric aluminoxanes, especially methyl aluminoxane, as well as inert, compatible, noncoordinating, ion forming compounds. So called modified methyl aluminoxane (MMAO) is also suitable for use as a cocatalyst. One technique for preparing such modified aluminoxane is disclosed in U.S. Pat. No. 5,041,584, the disclosure of which is incorporated herein by reference. Aluminoxanes can also be made as disclosed in U.S. Pat. No. 5,218,071; U.S. Pat. No. 5,086,024; U.S. Pat. No. 5,041,585; U.S. Pat. No. 5,041,583; U.S. Pat. No. 5,015,749; U.S. Pat. No. 4,960,878; and U.S. Pat. No. 4,544,762, the disclosures of all of which are incorporated herein by reference.

Aluminoxanes, including modified methyl aluminoxanes, when used in the polymerization, are preferably used such that the catalyst residue remaining in the (finished) polymer is preferably in the range of from about 0 to about 20 ppm aluminum, especially from about 0 to about 10 ppm aluminum, and more preferably from about 0 to about 5 ppm aluminum. In order to measure the bulk polymer properties, (e.g. PI or melt fracture), aqueous HCl is used to extract the aluminoxane from the polymer. Preferred cocatalysts, however, are inert, noncoordinating, boron compounds such as those described in EP 520732, the disclosure of which is incorporated herein by reference.

Substantially linear ethylene are produced via a continuous (as opposed to a batch) controlled polymerization process using at least one reactor (e.g., as disclosed in WO 93/07187, WO 93/07188, and WO 93/07189, the disclosure of each of which is incorporated herein by reference), but can also be produced using multiple reactors (e.g., using a multiple reactor configuration as described in U.S. Pat. No. 3,914,342, the disclosure of which is incorporated herein by reference) at a polymerization temperature and pressure sufficient to produce the interpolymers having the desired properties. The multiple reactors can be operated in series or in parallel, with at least one constrained geometry catalyst employed in at least one of the reactors.

Substantially linear ethylene polymers can be prepared via the continuous solution, slurry, or gas phase polymerization in the presence of a constrained geometry catalyst, such as the method disclosed in EP 416,815-A, the disclosure of which is incorporated herein by reference. The polymerization can generally be performed in any reactor system known in the art including, but not limited to, a tank reactor(s), a sphere reactor(s), a recycling loop reactor(s) or combinations thereof and the like, any reactor or all reactors operated partially or completely adiabatically, nonadiabatically or a combination of both and the like. Preferably, a continuous loop-reactor solution polymerization process is used to manufacture the substantially linear ethylene polymer used in the present invention.

In general, the continuous polymerization required to manufacture substantially linear ethylene polymers may be accomplished at conditions well known in the prior art for Ziegler-Natta or Kaminsky-Sinn type polymerization reactions, that is, temperatures from 0 to 250° C. and pressures from atmospheric to 1000 atmospheres (100 MPa). Suspension, solution, slurry, gas phase or other process conditions may be employed if desired.

A support may be employed in the polymerization, but preferably the catalysts are used in a homogeneous (i.e., soluble) manner. It will, of course, be appreciated that the active catalyst system forms in situ if the catalyst and the cocatalyst components thereof are added directly to the polymerization process and a suitable solvent or diluent, including condensed monomer, is used in said polymerization process. It is, however, preferred to form the active catalyst in a separate step in a suitable solvent prior to adding the same to the polymerization mixture.

The substantially linear ethylene polymers used in the present invention are interpolymers of ethylene with at least one $C_3$–$C_{20}$ α-olefin and/or $C_4$–$C_{18}$ diolefin. Copolymers of ethylene and an α-olefin of $C_3$–$C_{20}$ carbon atoms are especially preferred. The term "interpolymer" as discussed above is used herein to indicate a copolymer, or a terpolymer, or the like, where, at least one other comonomer is polymerized with ethylene or propylene to make the interpolymer.

Suitable unsaturated comonomers useful for polymerizing with ethylene include, for example, ethylenically unsaturated monomers, conjugated or non-conjugated dienes, polyenes, etc. Examples of such comonomers include $C_3$–$C_{20}$ α-olefins such as propylene, isobutylene, 1-butene, 1-hexene, 1-pentene, 4-methyl-1-pentene, 1-heptene, 1-octene, 1-nonene, 1-decene, and the like. Preferred comonomers include propylene, 1-butene, 1-pentene, 1-hexene, 4methyl-1-pentene and 1-octene, and 1-octene is especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

The terms "heterogeneous" and "heterogeneously branched" mean that the ethylene polymer is characterized as a mixture of interpolymer molecules having various ethylene to comonomer molar ratios. As used herein, the terms "heterogeneous" and "heterogeneously branched" pertain to a single polymer composition or a component polymer of a polymer blend and, as such, the terms "heterogeneous" and "heterogeneously branched" are not meaningful in regards to a polymer blend.

Heterogeneously branched ethylene polymers are characterized as having a broad short chain branching distribution or composition distribution. Heterogeneously branched linear ethylene polymers are available from The Dow Chemical Company under the designations DOWLEX™ linear low density polyethylene and ATTANE™ ultra-low density polyethylene. Heterogeneously branched linear ethylene polymers can be prepared via the solution, slurry or gas phase polymerization of ethylene and at least one optional alpha-olefin comonomer in the presence of a Ziegler Natta catalyst by processes such as that disclosed in U.S. Pat. No. 4,076,698 to Anderson et al., incorporated herein by reference. Heterogeneously branched ethylene polymers are typically characterized as having molecular weight distributions, $M_w/M_n$, in the range of from 3.5 to 4.1 and, as such, are distinct from substantially linear ethylene polymers and homogeneously branched linear ethylene polymers in regards to both compositional short chain branching distribution and molecular weight distribution.

Low density polyethylene (LDPE) (which as used herein refers to homopolymer polyethylene) and the various high pressure, free-radical initiated ethylene interpolymers can be manufactured by any known polymerization process, including using autoclave, tube or modified tube reactors.

When an autoclave reactor is employed, the reaction zone can be a single zone or multiple zone. Telogens such as, for example propylene and isobutane, can also be used as chain transfer agents in the manufacture of the high pressure, free-radical initiated ethylene polymers, including low density polyethylene (LDPE) and interpolymers of ethylene and at least one α, β ethylenically unsaturated comonomer such as, for example, but not limited to, acrylic acid. Generally, an autoclave reactor without the addition of a telogen will be used to manufacture ethylene polymers with higher melt strengths while a tubular process and/or telogens will be employed to manufacture ethylene polymers with lower melt strengths. However, the combination of an autoclave reactor in series or parallel with a tubular reactor, two or more autoclave reactors or two or more tubular reactors all in series or parallel configuration is also suitable for making the extrusion composition of the present invention, either directly or in manufacturing component polymer products to be used to prepare the extrusion composition of the present invention.

Suitable free-radical initiators for polymerizing ethylene at high reactor pressures are well known and include, but are not limited to, peroxides and oxygen. Techniques for maximizing the melt strength of ethylene polymers produced by high pressure polymerization are also known and include, but are not limited to, maximizing the reaction zone temperature differential, multiple initiator injections, extended reactor and post reactor residence times and higher monomer inlet temperatures. Suitable methods and procedures for manufacturing high pressure, free-radical ethylene polymers useful in the present invention are described in U.S. Pat. Nos. 3,436,363; 3,520,861; 4,599,392; and 4,988,781, the disclosures of which are incorporated herein by reference.

Suitable olefin polymers for use in the present invention include propylene, ethylene, styrene and butylene polymers. Particularly suitable olefin polymers for used in the invention include polypropylene, polystyrene, polyethylene and styrene butadiene block polymers. Preferred olefin polymers for use in the invention as the at least one olefin polymer are ethylene polymers.

Suitable ethylene polymers for use in the present invention as the at least one olefin polymer include, but are not limited to, high pressure, free-radical initiated polymers, Ziegler-Natta catalyzed polymers and metallocene catalyzed (especially using constrained geometry catalyzed) polymers. Thus, suitable ethylene polymers include low density polyethylene, high density polyethylene, medium density polyethylene, linear low density polyethylene (LLDPE), ultra (or very) low density polyethylene, substantially linear ethylene polymers (homopolymers and interpolymers), ethylene acrylic acid (EAA) interpolymers, ethylene methacrylic acid (EMAA) interpolymers, ethylene vinyl acetate (EVA) interpolymers, ethylene ethyl acrylate (EEA) interpolymers, ethylene meth methacrylate (EMMA) interpolymers, maleic anhydride grafted polyethylene (including, for example, but not limited to, grafts based LLDPE and substantially linear ethylene polymers as described, for example, in U.S. Pat. Nos. 4,684,576; 5,066,542 and 5,346,963), ionomers, ethylene carbon monoxide (ECO) interpolymers, ethylene propylene (EP) interpolymers, ethylene propylene diene monomer (EPDM) polymers, and ethylene styrene interpolymers. The preferred polymers for use in a single polymer composition included homogeneously branched ethylene polymers, heterogeneously branched ethylene polymers (e.g., LLDPE and VLDPE), low density homopolymer polyethylene and high pressure free-radical initiated ethylene interpolymers (e.g., EAA, EVA, EMAA, EMMA and EEA). The most preferred polymers for use in a single polymer composition of the present invention are heterogeneously branched linear low density polyethylene (LLDPE), low density homopolymer polymer (especially when manufactured using a tubular or short-tube reactor), homogeneously branched linear ethylene polymers, and substantially linear ethylene polymers with substantially linear ethylene interpolymers being especially preferred.

Suitable polymer blends include, but are not limited to, at least one high pressure, free-radical initiated polymer blended with either at least one Ziegler catalyzed polymer, at least one metallocene catalyzed polymer, at least one constrained geometry catalyzed polymer, or another high pressure, free-radical initiated polymer. Other suitable polymer blends include, but are not limited to, at least one homogeneously branched ethylene polymer blended with either at least one high pressure, free-radical initiated polymer, at least one Ziegler catalyzed polymer or another homogeneously branched ethylene polymer.

Especially suitable polymer blends included low density polyethylene blended with either at least one heterogeneously branched linear low density ethylene polymer, at least one homogeneously branched linear low density ethylene polymer, at least one substantially linear ethylene polymer, or at least one ethylene acrylic acid copolymer. The most preferred polymer blend for use in the present invention comprises at least one substantially linear ethylene polymer and at least one low density homopolymer polyethylene (LDPE).

The at least one olefin polymer can also be blended with other polymers such as, for example, another olefin polymer, polyester, epoxies, polyurethane, polyamide, poly lactic acid interpolymer, polycarbonate, natural and synthetic rubbers, and/or thermoplastic vulcanate to prepare the inventive extrusion composition. Preferred other polymers for blending with the at least one olefin polymer are thermoplastic polymers characterized as having low melt strength, i.e., less than or equal to 6.5 cN. Such polymers include poly lactic acid interpolymers and polyamides. For example, EcoPLA 1100 is a poly lactic acid interpolymer, commercially supplied by Cargill-Dow, and has a Rheotens melt strength value of less than 0.5 centiNewtons.

Further, other polymers can be blended with the inventive composition to modify the performance attributes of the composition such as, for example, the melt strength, processing, film strength, heat seal, or adhesion characteristics of the inventive composition.

The inventive polymer blend composition comprising (or made from) at least one high pressure free-radical initiated ethylene polymer (e.g., LDPE, EAA or ionomer) and at least one heterogeneously branched linear ethylene polymer (e.g., VLDPE, MDPE or LLDPE) or at least one homogeneously branched ethylene polymer (i.e., a homogeneously branched linear ethylene polymer or a substantially linear ethylene polymer), can be prepared at any blend ratio respecting the component polymers.

Preferably, the polymer blend comprises from about 1 to about 90 weight percent of at least one high pressure free-radical initiated ethylene polymer and from about 10 to about 99 weight percent of at least one heterogeneously branched linear ethylene polymer or at least one homogeneously branched ethylene polymer (based on the total weight of the inventive composition); more preferably the polymer blend comprises from about 2 to about 50 weight percent of at least one high pressure free-radical initiated ethylene polymer and from about 50 to about 98 weight percent of at least one heterogeneously branched linear ethylene polymer or at least one homogeneously branched ethylene polymer (based on the total weight of the inventive composition); most preferably the polymer blend comprises from about 3 to about 27 weight percent of at least one high pressure free-radical initiated ethylene polymer and from about 73 to about 97 weight percent of at least one heterogeneously branched linear ethylene polymer or at least one homogeneously branched ethylene polymer (based on the total weight of the inventive composition); and most especially the polymer blend comprises from about 4 to about 19 weight percent of at least one high pressure free-radical initiated ethylene polymer and from about 81 to about 96 weight percent of at least one heterogeneously branched linear ethylene polymer or at least one homogeneously branched ethylene polymer (based on the total weight of the inventive composition)

The inventive extrusion composition can be used to prepare monolayer or multilayer coatings, films, articles and structures, such as, for example, a sealant, adhesive or tie layer. In certain embodiments of the invention, the substrate is coated or laminated one side with the inventive composition. In other particular embodiments of the invention, the substrate has the inventive composition coated or laminated (directly or indirectly) on both of its surfaces. The phrase "coated or laminated indirectly" as used herein means there may be some other material (e.g., a polymeric tie layer) interposed between the inventive composition and substrate (or what would be generally recognized as the substrate since thermoplastics and other plastics are not generally recognized as the substrate in multilayer construction).

When used, as the invention is not limited thereto, blend combinations can be prepared by any convenient method known in the art including dry blending, melt blending, side-arm extrusion or multiple reactor polymerization. Suitable multiple reactor polymerizations are described in U.S. Pat. No. 3,914,342, U.S. Pat. No. 5,677,383 and pending U.S. application Ser. No. 08/327,156, filed Oct. 21, 1994, the disclosures of both which are incorporated herein by reference. However, preferred multiple reactor polymerizations comprise non-adiabatic solution loop reactors as described in WO 97/36942, the disclosure of which is incorporated herein by reference.

The molecular weight distributions of ethylene polymers are determined by gel permeation chromatography (GPC) on a Waters 150C high temperature chromatographic unit equipped with a differential refractometer and three columns of mixed porosity. The columns are supplied by Polymer Laboratories and are commonly packed with pore sizes of $10^3$, $10^4$, $10^5$ and $10^6$ Å. The solvent is 1,2,4-trichlorobenzene, from which about 0.3 percent by weight solutions of the samples are prepared for injection. The flow rate is about 1.0 milliliters/minute, unit operating temperature is about 140° C. and the injection size is about 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science,* Polymer Letters, Vol. 6, p. 621, 1968, the disclosure of which is incorporated herein by reference) to derive the following equation:

$$M_{polyethylene} = a * (M_{polystyrene})^b.$$

In this equation, a=0.4316 and b=1.0. Weight average molecular weight, $M_w$, is calculated in the usual manner according to the following formula: $M_j = (\Sigma\, w_i(M_i^j))^j$; where $w_i$ is the weight fraction of the molecules with molecular weight $M_i$ eluting from the GPC column in fraction i and j=1 when calculating $M_w$ and j=-1 when calculating $M_n$.

In general, a narrow molecular weight distribution (i.e., low $M_w/M_n$ values) is indicative of low melt strength. Conversely, a broad molecular weight distribution (i.e., high $M_w/M_n$ values) is indicative of high melt strength. For the at least one homogeneously branched ethylene polymer used in the present invention, the $M_w/M_n$ is preferably less than 3.5, more preferably less than 3.0, most preferably less than 2.5, and especially in the range of from about 1.5 to about 2.5 and most especially in the range from about 1.8 to about 2.3.

The heterogeneously branched ethylene polymers useful in the invention typically have molecular weight distributions, $M_w/M_n$, in the range of from 3.5 to 4.1. The high pressure, free-radical initiated ethylene polymers useful in the invention typically have molecular weight distributions, $M_w/M_n$, greater than about 5 and preferably, for low density polyethylene (LDPE), in the range from about 5.5 to about 8. Suitable high pressure, free-radical initiated ethylene polymers can also have a bimodal molecular weight distribution as observed from GPC elution curves. However, bimodality tends to be indicative of high melt strength. Thus, as in every case with polymers employed as or used in a polymer blend to prepare the inventive composition, polymers with bimodality should be carefully selected to insure the inventive combination of requirements are met.

The Vicat softening point of the inventive composition is determined in accordance with ASTM D-1525.

The density of the substantially linear ethylene polymer or homogeneously branched linear ethylene polymer, as measured in accordance with ASTM D-792, does not exceed about 0.92 g/cm$^3$ when employed as a single polymer extrusion composition, and is generally in the range from about 0.85 g/cm$^3$ to about 0.92 g/cm$^3$, preferably from about 0.86 g/cm$^3$ to about 0.91 g/cm$^3$, and especially from about 0.86 g/cm$^3$ to about 0.90 g/cm$^3$. When employed to prepare a polymer blend with at least one other polymer, the density of the substantially linear ethylene polymer or homogeneously branched linear ethylene polymer can be any density less than or equal to about 0.97 g/cm$^3$.

The density of suitable low density polyethylene (LDPE) will preferably be in the range from about 0.917 g/cm$^3$ to about 0.925 g/cm$^3$ as measured in accordance with ASTM D-792. Suitable low density polyethylene (LDPE) resins for use in the present invention are available, for example, from The Dow Chemical Company, Chevron and Westlake under the designations of 5004I, 4517 and EC479, respectively.

Although low density homopolymer polyethylene (LDPE), whether manufactured using a telogen or chain transfer agent or not, is the most preferred high pressure free-radical initiated ethylene polymer, suitable high pressure, free-radical initiated ethylene interpolymers (and ionomers made therefrom) can also be used in the invention. The density of suitable high pressure, free-radical initiated ethylene interpolymers will vary with the amount of comonomer present for the interpolymer and will contain from about 0.01 to about 50 weight percent comonomer, preferably from about 1 to about 22 weight percent comonomer, and especially from about 2 to about 12 weight percent comonomer. Suitable high pressure, free-radical initiated ethylene interpolymers are available, for example, from The Dow Chemical Company and Dupont Chemical Company under the designations of PRIMACOR™ adhesive polymer 3330 and SURLYN™ ionomer 1652, respectively.

The molecular weight of the at least one olefin polymer used in the present invention can be conveniently indicated using a melt index measurement according to the following ASTM D-1238 Conditions: Condition 125° C./2.16 kg; Condition 190° C./2.16 kg (formerly known as "Condition (E)" and also known as $I_2$); Condition 190° C./10 kg; Condition 190° C./21.601 kg; Condition 190° C./5 kg; Condition 230° C./2.16 kg; Condition 200° C./50 kg; Condition 230° C./2.3 kg; and Condition 230° C./1.2 kg. The molecular weight of the inventive extrusion composition is conveniently indicated using ASTM D-1238, Condition 190° C./2.16 kg (i.e., an $I_2$ melt index).

Melt index is generally inversely proportional to the molecular weight and melt strength of the polymer. Thus, generally, the higher the molecular weight, the lower the melt index and the higher the melt strength, although the relationships are not linear. Irrespective of the molecular weight or melt index of the component polymers (i.e., the at least olefin polymer or the at least one other polymer), which can range from very low to very high values, the $I_2$ melt index at 190° C. of the inventive extrusion composition can of any value that provides the required melt strength. Preferably, the $I_2$ melt of the inventive extrusion composition and component polymers is in the range of from about 0.01 grams/10 minutes (g/10 min) to about 300 g/10 min, more preferably in the range of from about 0.1 g/10 min. to about 100 g/10 min., most preferably in the range of from about 1 g/10 min to about 50 g/10 min. In certain preferred embodiments of the invention, the $I_2$ melt of the inventive extrusion composition is in the range of even more preferably in the range of from about 1 g/10 min. to about 30 g/10 min., and more preferably $I_2$ melt of the inventive extrusion composition is in the range of from about 2 g/10 min. to about 10 g/10 min.

Another measurement useful in characterizing the molecular weight of ethylene polymers is a melt index measurement according to ASTM D-1238, Condition 190° C./10 kg (formerly known as "Condition (N)" and also known as $I_{10}$). The ratio of the $I_{10}$ and the $I_2$ melt index at 190° C. is the melt flow ratio and is designated herein as $I_{10}/I_2$. For substantially linear ethylene polymers, the $I_{10}/I_2$ ratio indicates the degree of long chain branching, i.e., the higher the $I_{10}/I_2$ ratio, the more long chain branching in the polymer. In general, for substantially linear ethylene polymers useful in the inventive, higher $I_{10}/I_2$ ratios indicate higher melt strength. The $I_{10}/I_2$ ratio of the substantially linear ethylene polymer is at least about 6.5, preferably at least about 7, especially at least about 8. The $I_{10}/I_2$ ratio of homogeneously branched linear ethylene polymers is generally about 6.

Additives such as antioxidants (e.g., hindered phenolics such as Irganox® 1010 or Irganox® 1076 supplied by Ciba Geigy), phosphites (e.g., Irgafos® 168 also supplied by Ciba Geigy), cling additives (e.g., PIB), Standostab PEPQ™ (supplied by Sandoz), pigments, colorants, fillers, and the like can also be included in the ethylene polymer extrusion composition of the present invention, to the extent that they do not interfere with the pinhole-free, pinhole-resistance performance discovered by Applicants. The article made from or using the inventive composition can also contain additives to enhance antiblocking and coefficient of friction characteristics including, but not limited to, untreated and treated silicon dioxide, talc, calcium carbonate, and clay, as well as primary, secondary and substituted fatty acid amides, chill roll release agents, silicone coatings, etc. Other additives can also be added to enhance the anti-fogging characteristics of the inventive extrusion composition. For example, U.S. Pat. No. 4,486,552, to Niemann, the disclosure of which is incorporated herein by reference, describes an effective anti-fog additive system. Still other additives, such as quaternary ammonium compounds alone or in combination with ethylene-acrylic acid (EAA) copolymers or other functional polymers, can also be added to enhance the antistatic characteristics of the extrusion coatings and extrusion cast films of this invention and allow, for example, the packaging of electronically sensitive goods and liquids.

However, as discussed herein above, additives should be selected such that minimum amounts, if any, of moisture or other volatile substance is added to the composition, substrate, etc. That is, practitioners will appreciate that in selecting or manufacturing the polymer, polymers, additives and processes to prepare the inventive extrusion composition care should be taken not to utilize or add those ingredients, additives, techniques, procedures and the like that can contribute to pinholing. For example, the polymer (s) should be relatively gel-free and additives with high moisture contents should be avoided.

The inventive extrusion composition is useful for making both monolayer and multilayer constructions. By the term "monolayer" it is meant that the coated or laminated substrate or article comprises only one polymeric layer and the inventive extrusion composition is the one polymer layer; however, the one polymeric layer itself can be multilayered as long as each layer comprises the inventive extrusion composition (e.g., a two or three layer co-extrusion coated 3–4 layer construction wherein the substrate is one layer of the construction and wherein one layer of the co-extrusion coating comprises a single polymer composition and the other one or two layers of the co-extrusion comprise a polymer blend).

Monolayered substrates or articles and multilayer constructions can made using any convenient application technique known in the art, including, but not limited to, extrusion coating, co-extrusion coating, adhesive or extrusion lamination, cast film fabrication, blown film fabrication, blown coextrusion, sintering, injection molding, spray coating, dip coating, in-mold coating, blow molding, rotomolding, compression molding, doctoring and the like and combinations thereof. That is, the term "extrusion composition" is not limited to application techniques, methods and/or procedures that include an extrusion step, although extrusion application techniques are preferred and extrusion coating or co-extrusion coating are the most preferred application techniques.

The terms "coated or laminated" or "coating or laminate" as used herein refer to a substrate or article which includes at least one polymeric layer wherein the layer comprises at least one inventive composition. The terms "coated or laminated" or "coating or laminate" are independent of which application technique (or combination of application techniques) is actually employed to apply or combine an inventive composition to or with a substrate or article.

The inventive extrusion composition can also be employed in multilayer constructions that include at least one barrier layer or material (e.g. aluminum or Saran™ PVDC dispersion coating). Such barrier layer or material may contribute to the overall pinhole resistance of the coated or laminated substrate, however it should not be employed in way that compromises the present discovery.

The inventive olefin polymer extrusion composition, whether for monolayer or multilayered polymer construction, can be used to make extrusion coatings, extrusion cast films and blown films suitable for subsequent lamination onto a substrate. When the inventive composition is used for coating purposes or in multilayered constructions, substrates or adjacent material layers can be polar or nonpolar including for example, but not limited to, cellulosics (e.g. paper products such as paperboard), metals, nonwovens, ceramics, fabrics, glass and various polymers, particularly other polyolefins, and combinations thereof. A preferred substrate for the inventive extrusion composition is paperboard.

The inventive extrusion composition can also be used to make various articles including, but not limited to, food, industrial, medical and consumer storage containers and packages; food, medical and consumer disposable containers (e.g., single-use measuring cups, hand wipe paks and beverage cups); retail packages and containers (e.g. motor oil, brake fluid, milk and bleach containers). The inventive extrusion composition is particularly well suited making containers for containing flowable materials. However, the inventive extrusion composition is most particularly suited for making disposable beverage containers (for such beverages as, for example, but not limited to, wine, beer, coffee, milk and milk products, fruit and vegetable juices, cappuccino, expresso, café latte, tea, cocoa, flavored punches, soft drinks, water and sports drinks) and disposable personal care packages (e.g., single-use towellettes). The inventive composition is especially suited for use in making containers subject to hot flowable materials (e.g., hot fill packages for pastes and soups) and is most especially suited for use in making disposable containers subject to hot beverages (e.g., paper coated cups for hot coffee products such as coffee and cappuccino).

With the benefit of the present invention, practitioners will now be able to prepare pinhole-free, pinhole-resistant extrusion coatings by selecting or preparing an extrusion composition having the specified melt strength (i.e., the inventive ethylene polymer extrusion composition). In addition to the interrelationships and control possibilities mentioned herein above such as, for example, a lower melt index to increase melt strength, suitable olefin polymers and the inventive extrusion composition can be prepared by employing any convenient method known in the art. Such as, for example, in the case of high pressure, free-radical initiated ethylene polymers, higher monomer inlet temperatures to the reactor and/or telogen utilization can control the melt strength of the resultant polymer towards lower values. For Ziegler catalyzed polymers, catalyst selection and reactor configuration are known to control the melt strength of resultant polymers. In general, for Ziegler catalyzed ethylene polymers (as well as high pressure free-radical initiated ethylene polymers), melt strength relates to molecular weight distribution such that a narrower molecular weight distribution polymer generally has a lower melt strength value. For substantially linear ethylene polymers, higher degrees of long chain branching (in the range of 0.01 long chain branch/1000 carbons to 3 long chain branches/1000 carbons) and, as mentioned herein above, higher $I_{10}/I_2$ ratios generally mean higher melt strength values.

EXAMPLES

The following examples illustrate some of the particular embodiments of the present invention, but the following should not be construed to mean the invention is limited to the particular embodiments shown.

Melt strength determinations were made at 190° C. using a Goettfert Rheotens and an Instron capillary rheometer. The capillary rheometer was aligned and situated above the Rheotens unit and delivers, at a constant plunger speed of 25.4 millimeters/minute (mm/min), a filament of molten polymer to the Rheotens unit. The Instron was equipped with a standard capillary die of 2.1 mm diameter and 42 mm length (20:1 L/D) and delivered the filament to the toothed take-up wheels of the Rheotens unit rotating at 10 millimeters/second (mm/s). The distance between the exit of the Instron capillary die and the nip point on the Rheotens take-up wheels was 100 mm. The experiment to determine melt strength begun by accelerating the take-up wheels on the Rheotens unit at 2.4 mm/s$^2$, i.e. the Rheotens unit was capable of acceleration rates from 0.12 to 120 mm/s$^2$. As the velocity of the Rheotens take-up wheels increased with time, the draw down force was recorded in centiNewtons (cN) using the Linear Variable Displacement Transducer (LVDT) on the Rheotens unit. The computerized data acquisition system of the Rheotens unit recorded the draw down force as a function of take-up wheel velocity. The actual melt strength value was taken from the plateau of the recorded draw down force.

Although determined using different methodologies and provide different actual values, melt strength and melt tension have been used interchangeably in the art in reference to the viscoelastic component or characteristics of ethylene polymers. Where these determinations are truly interchangeable, a convenient correlation can be developed between the two.

Figure 1:
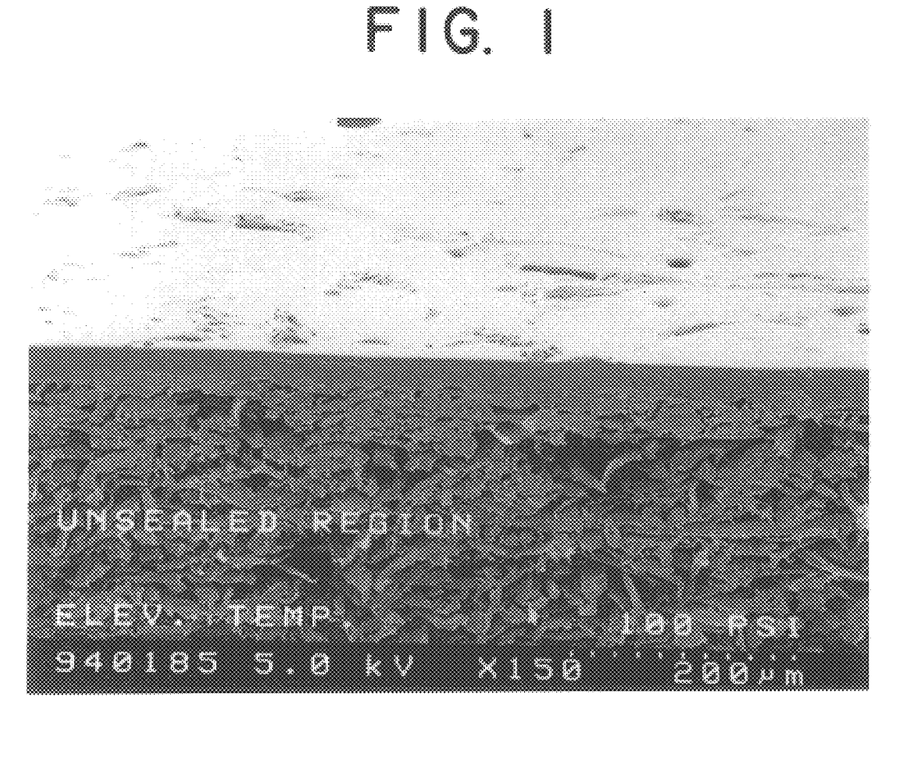
FIG. 1 is a microphotograph at 100× magnification of a cross-section of an extrusion coated paperboard surface prior to heat sealing.

Table 1 lists the various example olefin polymers investigated in the evaluations.

cessor system that include weight cell feed hoppers for rate checks and coating weight control. The extrusion line was also equipped with a matte finish, glycol-cooled chill roll set at 57° F. (14° C.). The targeted extrusion temperature and screw speed were set to 625° F. (329° C.) and 90 rpm, respectively. FIG. 1 is a photomicrograph of the extrusion coated paperboard (comparative example 1) prior to any post-coating heat sealing. FIG. 1 shows the resultant coating contained some surface defects including dimpling; however, FIG. 1 shows there was no detectable pinholing as the coating was substantially pinhole-free (at least initially prior to any heat sealing process step).

Inventive Examples 2, 3 and 5 and Comparative Example 4

In another evaluation, comparative example Resin A and Inventive Examples Resin B, Resin C and Resin D were extrusion coated onto 20 caliper bleached paperboard at 1 mil±0.25 mil (0.025 mm±0.006 mm) coating thickness. The extrusion equipment and settings were as described above for Comparative Example 1. After the coating step, each coated paperboard was subjected to a heat sealing process step using hot air set at approximately 1000° F. (537° C.) for about 0.75 second, although no heat seals are actually formed. That portion of comparative example Resin A and Inventive Examples Resin B and Resin C that was exposed to heat sealing hot air was photomicrographed at 100×

TABLE 1

| Resin or Composition | Melt Index, I$_2$ g/10 min. | Density g/cm$^3$ | Melt Strength cN | Corrected Melt Strength, cN | Ethylene Polymer Type | Supplier |
|---|---|---|---|---|---|---|
| A* | 5 | 0.922 | 7.37 | 7.37 | LDPE | PE 4517 |
| B | 5.5 | 0.917 | 5.3 | 4.8 | LDPE/SLEP composition | 75/25 blend: A/E |
| C | 6.8 | 0.907 | 2.8 | 2.06 | LDPE/SLEP composition | 25/75 blend: A/E |
| D | 6.1 | 0.912 | 3.8 | 3.1 | LDPE/SLEP composition | 50/50 blend: A/E |
| E | 7.5 | 0.902 | 1.99 | 1.33 | SLEP composition | AFFINITY ™ PT 1450 |
| F* | 4.2 | 0.923 | 8.88 | 10.6 | LDPE | 5004I |
| G* | 5.5 | 0.920 | 7.31 | 6.65 | LDPE | PE EC479 |
| H | 5.5 | 0.921 | 3.12 | 2.84 | LLDPE composition | DOWLEX ™ 3010 |

*Resin or Composition as described in Table 1 is not suitable for use in the present invention as a single polymer composition although it may be suitable (or become suitable) when blended with at least one other polymer, additive or modifier. Such resin or composition is referred to herein a comparative example resin.
SLEP denotes a substantially linear ethylene polymer.
LDPE denotes low density homopolymer polyethylene.
LLDPE denote heterogeneously branched linear low density polyethylene.
PE 4517 is supplied by Chervon.
AFFINITY ™ PT 1450, 5004I, AND DOWLEX ™ are supplied by The Dow Chemical Company.
PE EC479 is supplied by Westlake.

Comparative Example 1

In a first evaluation, 20 caliper bleached paperboard was extrusion coated with 1 mil±0.25 mil (0.025 mm±0.006 mm) of comparative example Resin A. The coating equipment consisted of a three-extruder Black Clawson coextrusion coating line equipped with a 3½ inch (8.9 cm) diameter, 30:1 L/D primary extruder as well as a 2½ inch (6.4 cm) diameter, 24:1 L/D satellite extruder and a 2 inch (5.1 cm) diameter, 24:1 L/D satellite extruder. A 76 cm slot coextrusion feedblock die was attached to the primary extruder and deckled to 69 cm with a 20 mil (0.51 mm) die gap and a 6 inch (15.2 cm) air/draw gap. The line was controlled by a micropromagnification using a bright light illuminating electron microscope. FIG. 2 provides the photomicrographs for the three examples at 100× magnification.

Figure 2A:
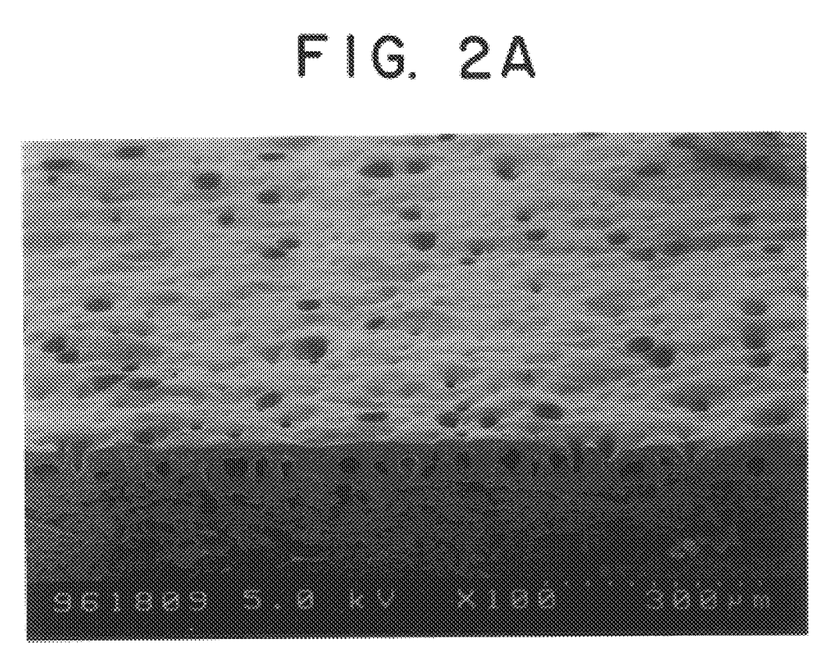
FIG. 2 is a series of microphotographs at 100× magnification of a cross-section of various extrusion coated paperboard examples.
Figure 2B:
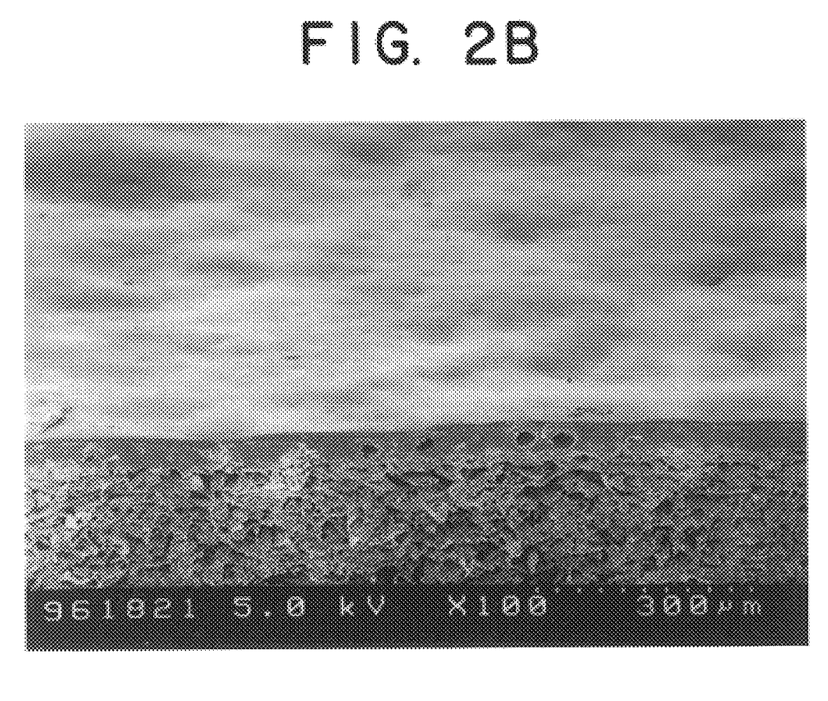
Figure 2C:
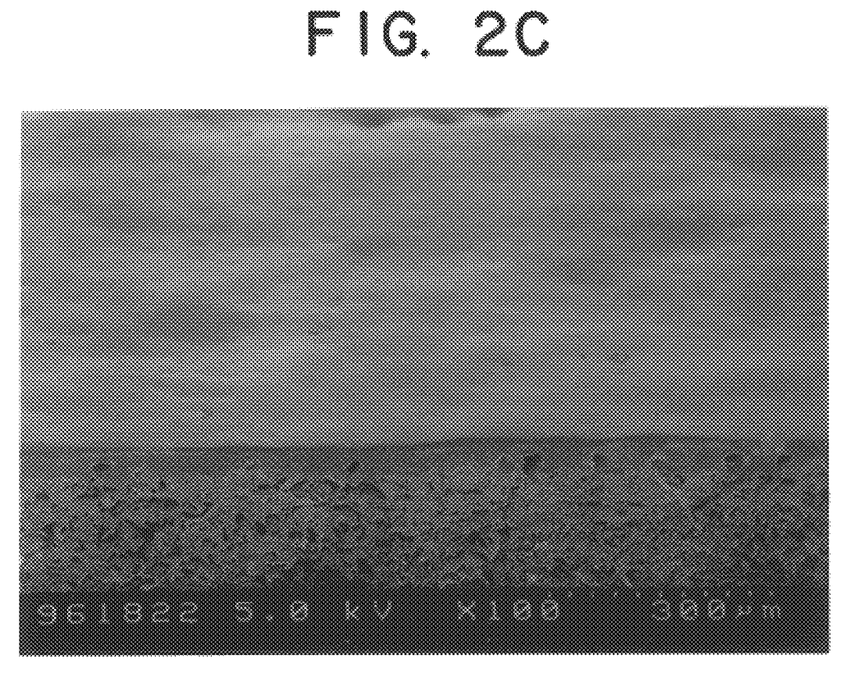
Figure 2D:
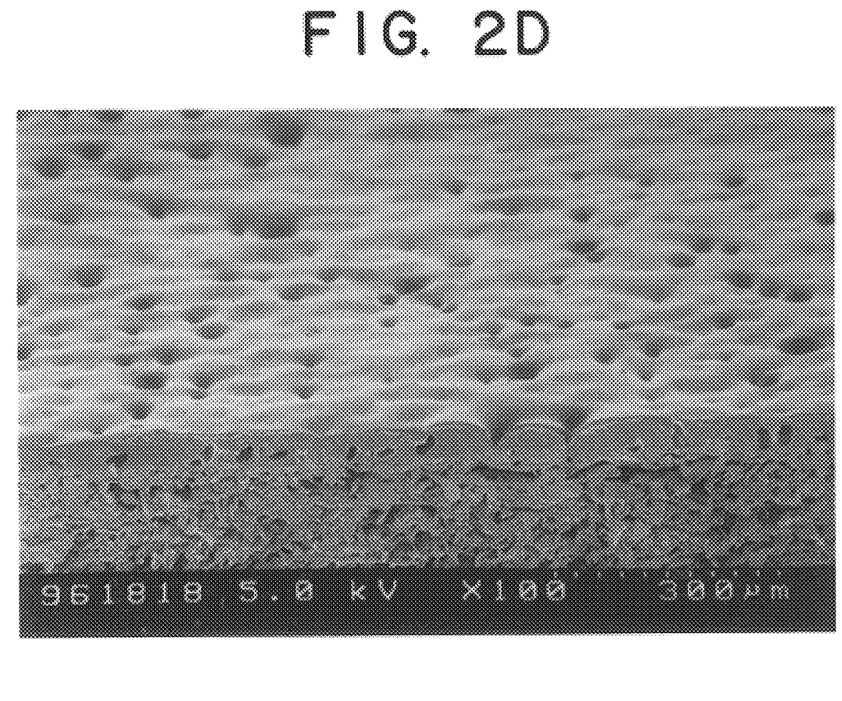

FIG. 2a shows comparative example 4 (which employed comparative example Resin A) possessed numerous pinholes and excessive dimples. Conversely, FIG. 2b, 2c and 2d show Inventive Examples 2, 3 and 5 (which employed Inventive Example Compositions B, C and D, respectively) were pinhole-free after the 1000° F. (537° C.) heat sealing hot air process step with Inventive Example 3 showing only a few dimples and Inventive Example 5 showing significant dimples.

Figure 3A:
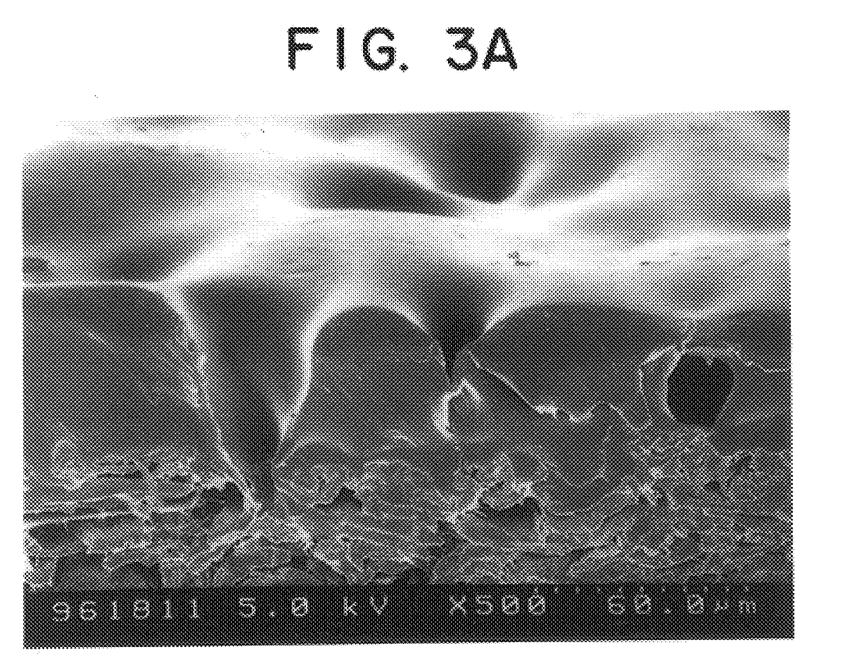
FIG. 3 is a series of microphotographs at 500× magnification of a cross-section of various extrusion coated paperboard examples.
Figure 3B:
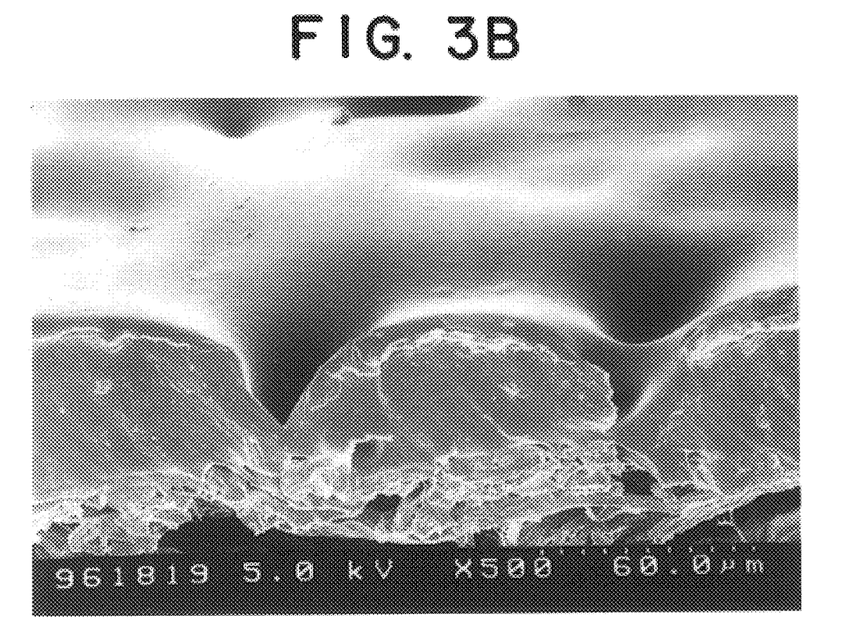

That portion of extrusion coated comparative example Resin A (comparative example 4) and Inventive Example Resin D (Inventive Example 5) that was exposed to the hot air were photomicrographed at 500× magnification using a bright light illuminating electron microscope. FIG. 3 provides the series of photomicrographs for the two examples at 500× magnification. FIG. 3a shows Comparative Example 4 suffered actual pinholes with actual rupture and burst-through, leaving the paperboard substrate exposed and unprotected respecting flowable material penetration and/or leakage. In contrast, FIG. 3b shows Inventive Example 5 was characterized by some dimpling; however, no actual pinholing (i.e., no rupture or burst-through that left the substrate exposed and unprotected) was detected in the photomicrograph of Inventive Example 5 at 500× magnification.

Comparative Examples 6, 7 and 8 and Inventive Examples 9, 10, 11 and 12

In another evaluation, comparative examples Resin A (comparative example 6), Resin G (comparative example 7) and Resin F (comparative example 8) as well as Inventive Examples Resin B (Inventive Example 9), Resin C (Inventive Example 10), Resin E (Inventive Example 11) and Resin H (Inventive Example 12) were all extrusion coated onto 20 caliper bleached paperboard at 1 mil±0.25 mil (0.025 mm±0.006 mm) coating thickness using the equipment and settings indicated above for comparative example 1. Each coated paperboard sample was then formed into 237 cm³ cups using conventional cup-making equipment wherein the back seal and the cup bottom portion were heat sealed with hot air set at about 1000° F. (537° C.) for about 0.75 second. Each cup was then filled with an alcohol, water and food coloring dye mixture and permitted to stand undisturbed for 24 hours at ambient room temperature (about 23° C.) where thereafter the cups were emptied. The seal surface area of cup exposed to the test mixture was about 18.1 cm². The number of pinholes visible at the external surfaces of cup was then counted and recorded.

Although a test mixture of alcohol, water and food coloring dye was used in this evaluation, similar results are obtainable using prepared or commercial beverages. Also, the exposure time of the sealed area to the test mixture or beverage required for meaningful comparative results can be accelerated by usual laboratory techniques such as by employing elevated temperatures, pressure, surfactants and/or wetting agents.

Table 2 summaries the pinhole count for each example cup in the present evaluation.

TABLE 2

| Example | Resin | Pinholes per cm² per 237 cm³ |
|---|---|---|
| Comp. Ex. 6 | Comparative Resin A | 1.66 |
| Comp. Ex. 7 | Comparative Resin G | 1.66 |
| Comp. Ex. 8 | Comparative Resin F | ≧3.60 |
| Inventive Ex. 9 | Inventive Resin B | ≦1.05 |
| Inventive Ex. 10 | Inventive Resin C | 0.17 |
| Inventive Ex. 11 | Inventive Resin E | 0.00 |
| Inventive Ex. 12 | Inventive Resin H | 0.94 |

Figure 4:
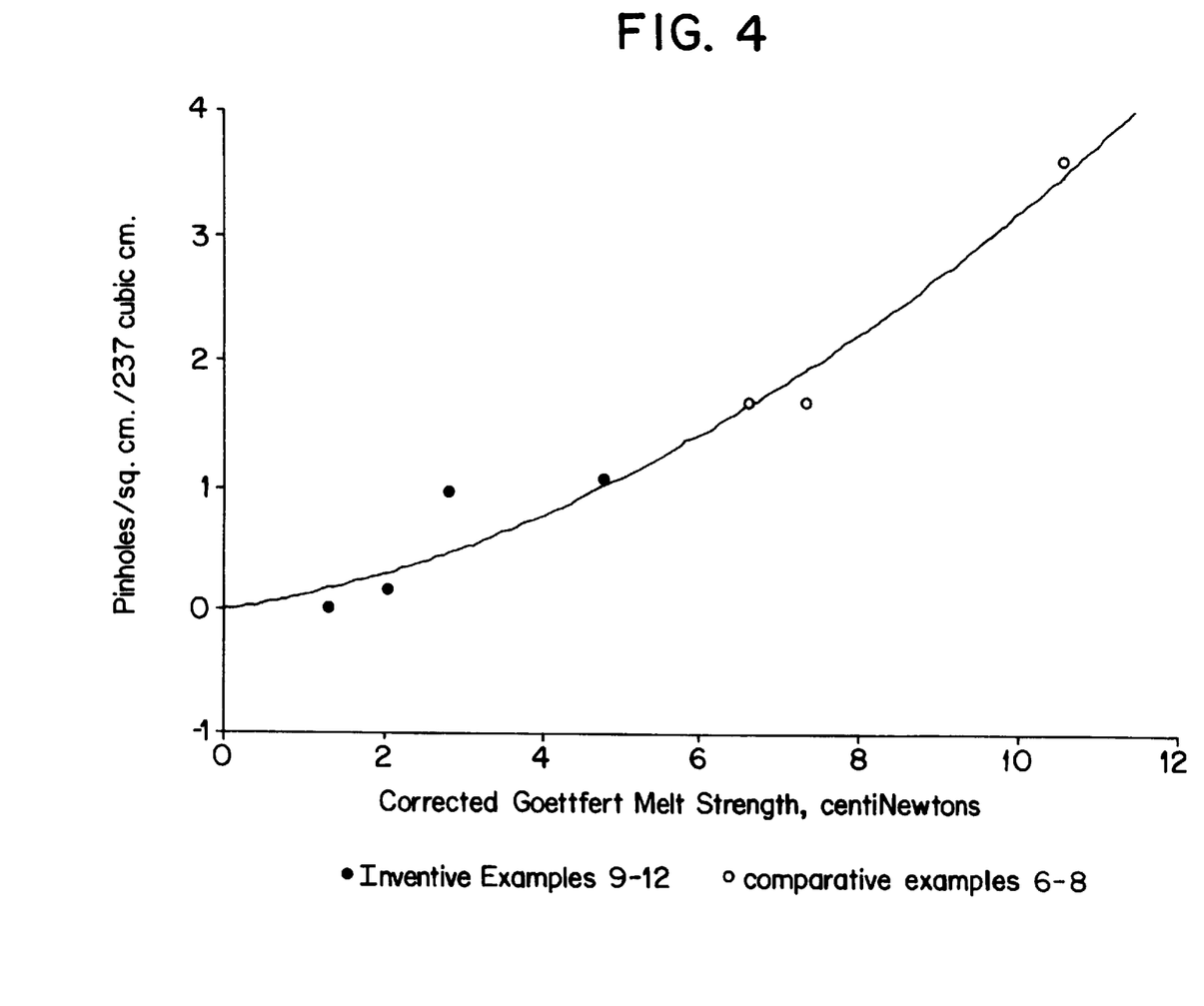
FIG. 4 is a simple plot of the relationship between the melt strength of various example ethylene polymers and number of pinholes.

From the data in Table 2, FIG. 4 was prepared to illustrate the relationship between melt strength and pinholes formation when the olefin polymer coatings were subjected to thermal treatment or heat history after the extrusion coating process step. FIG. 4 indicates that less than about 1.5 pinholes per cm² occurred for 237 cm³ cups where the polymer extrusion composition was characterized as having a corrected Goettfert melt strength at 190° C. of less than or equal to about 6.5 centiNewtons (cN); about 1 or less pinholes per cm² per 237 cm³ occurred at less than or equal to about 5 cN; about 0.5 or less pinhole per cm² per 237 cm³ occurred at less than or equal to about 2.7 cN; and zero to about 0.25 pinholes per cm² per 237 cm³ (i.e., essentially pinhole-free) occurred at less than or equal to about 2 cN.

We claim:

1. A method for making a pinhole-resistant substrate comprising:

(a) providing an extrusion composition comprising at least one olefin polymer wherein the composition is characterized as having a corrected or actual Goettfert melt strength value at 190° C., as measured using a Rheotens unit, in the range of from about 0.01 centiNewtons to about 7.25 centiNewtons, (b) applying the composition to a substrate, (c) collecting the substrate with the extruded coating or laminated film for subsequent use or transferring the substrate with the extruded coating or laminated film for further processing, the coating or laminate being characterized as having from about 0 to about 1 pinholes per cm² of thermally exposed area after exposure to hot air at 537° C. for 0.75 second.

2. The method of claim 1, wherein the at least one olefin polymer is a high pressure, free-radical initiated ethylene polymer.

3. The method of claim 2, wherein the high pressure, free-radical initiated ethylene polymer is low density homopolymer polyethylene.

4. The method of claim 2, wherein the high pressure, free-radical initiated ethylene polymer is an interpolymer of ethylene and at least one ethylenically unsaturated comonomer.

5. The method of claim 4, wherein the interpolymer is an ethylene acrylic acid copolymer.

6. The method of claim 1, wherein the at least one olefin polymer is a homogeneously branched ethylene polymer.

7. The method of claim 6, wherein the homogeneously branched ethylene polymer is a substantially linear ethylene polymer characterized as having:

(a) a melt flow ratio, $I_{10}/I_2 \geq 5.63$, (b) a molecular weight distribution, $M_w/M_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the linear ethylene polymer has a homogeneously branched short chain branching distribution index (SCBDI) greater than 50 percent, no long chain branching and $I_2$ and $M_w/M_n$ values within 10 percent of the $I_2$ and $M_w/M_n$ values of the substantially linear ethylene polymer and wherein the respective critical shear rates of the substantially linear ethylene polymer and the linear ethylene polymer are measured at the same melt temperature using a gas extrusion rheometer, (d) a single differential scanning calorimetry, DSC, melting peak between −30 and 140° C., and (e) a short chain branching distribution index (SCBDI) of greater than 50 percent.

8. The method of claim 6, wherein the homogeneously branched ethylene polymer is a homogeneously branched linear ethylene polymer characterized as having:

(a) a single differential scanning calorimetry, DSC, melting peak between −30 and 140° C., and (b) a short chain branching distribution index (SCBDI) of greater than 50 percent.

9. The method of claim 1, wherein the composition is made from a high pressure, free-radical initiated ethylene polymer and a homogeneously branched ethylene polymer.

10. The method of claim 9, wherein the high pressure, free-radical initiated ethylene polymer is a low density polyethylene and the homogeneously branched ethylene polymer is a substantially linear ethylene polymer characterized as having:

(a) a melt flow ratio, $I_{10}/I_2 \geq 5.63$, (b) a molecular weight distribution, $M_w/M_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the linear ethylene polymer has a homogeneously branched short chain branching distribution index (SCBDI) greater than 50 percent, no long chain branching and $I_2$ and $M_w/M_n$ values within 10 percent of the $I_2$ and $M_w/M_n$ values of the substantially linear ethylene polymer and wherein the respective critical shear rates of the substantially linear ethylene polymer and the linear ethylene polymer are measured at the same melt temperature using a gas extrusion rheometer, (d) a single differential scanning calorimetry, DSC, melting peak between −30 and 140 C., and (e) a short chain branching distribution index (SCBDI) of greater than 50 percent.

11. The method of claim 9, wherein the high pressure, free-radical initiated ethylene polymer comprises from about 1 to about 90 weight percent of the total composition and the homogeneously branched ethylene polymer comprises from about 10 to about 99 weight percent of the total composition.

12. The method of claim 9, wherein the high pressure, free-radical initiated ethylene polymer comprises from about 2 to about 50 weight percent of the total composition and the homogeneously branched ethylene polymer comprises from about 50 to about 98 weight percent of the total composition.

13. The method of claim 9, wherein the high pressure, free-radical initiated ethylene polymer comprises from about 3 to about 27 weight percent of the total composition and the homogeneously branched ethylene polymer comprises from about 73 to about 97 weight percent of the total composition.

14. The method of claim 7 or 10, wherein the substantially linear ethylene polymer has about 0.01 to about 3 long chain branches/1000 carbons.

15. The method of claim 14, wherein the substantially linear ethylene polymer has at least about 0.1 long chain branch/1000 carbons.

16. The method of claim 15, wherein the substantially linear ethylene polymer has at least about 0.3 long chain branch/1000 carbons.

17. The method of claim 6, wherein the homogeneously branched ethylene polymer is an interpolymer of ethylene and at least one -olefin.

18. The method of claim 17, wherein the at least one -olefin is at least one $C_3$–$C_{20}$ α-olefin.

19. The method of claim 18, wherein the α-olefin is selected from the group consisting of 1-propylene, 1-butene, 1-isobutylene, 1-hexene, 4-methyl-1-pentene, 1-pentene, 1-heptene and 1-octene.

20. The method of claim 1, wherein the corrected or actual Goettfert melt strength at 190° C. is in the range of from about 0.01 to about 5 cN.

21. The method of claim 20, wherein the corrected or actual Goettfert melt strength value at 190° C. is in the range of from about 0.05 to about 2.7 cN.

22. The method of claim 21, wherein the corrected or actual Goettfert melt strength value at 190° C. in the range of from about 0.1 to about 2 cN.

23. The method of claim 1 wherein the applying step (b) is accomplished by either (i) extruding the composition onto the substrate as an extrusion coating, or (ii) fabricating the composition into a film and then laminating the film to the substrate.

24. The method of claim 23 where the applying step (b) is accomplished by direct extrusion of the composition onto the substrate.

* * * * *